Figure 1:
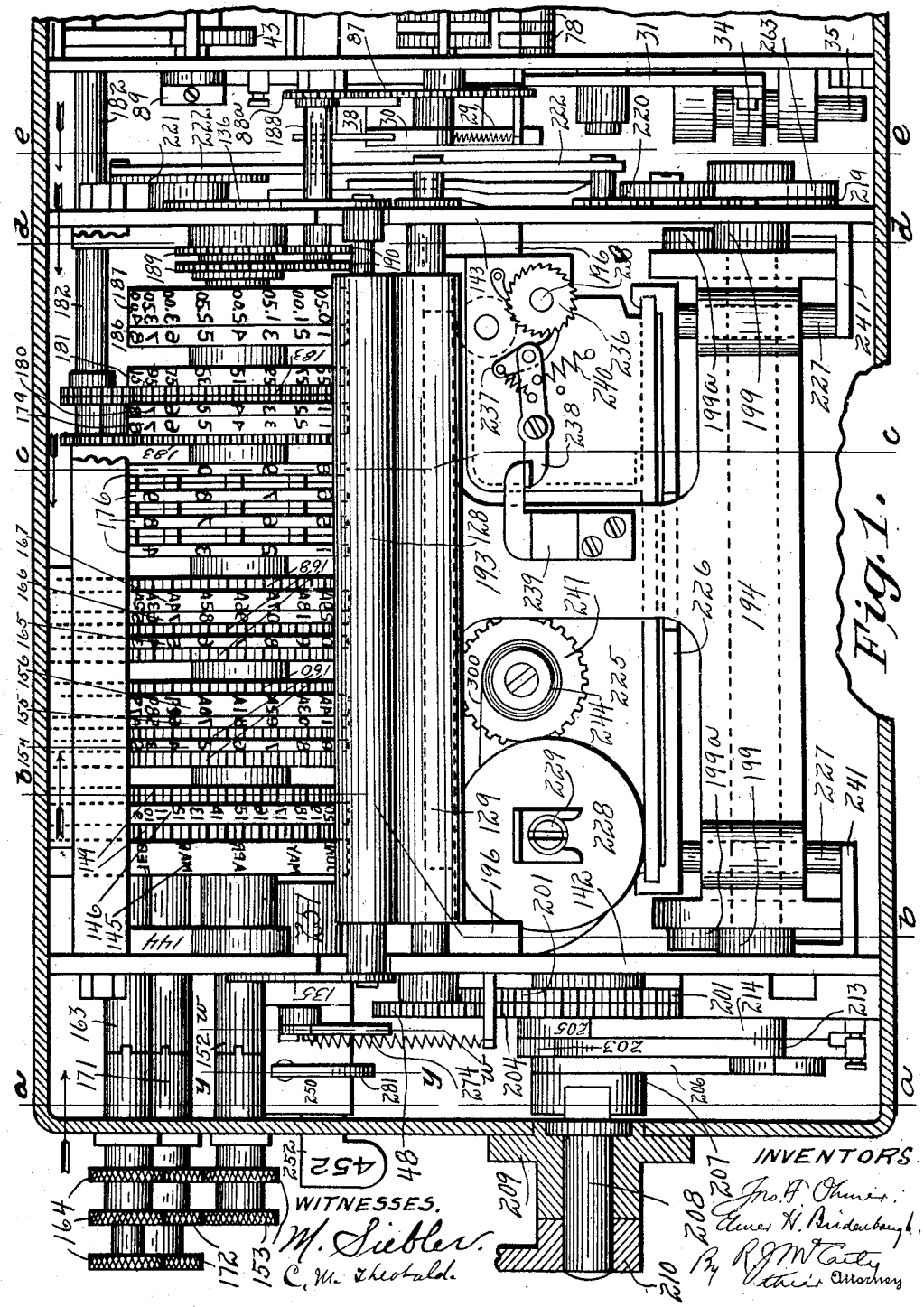
Figure 1A:
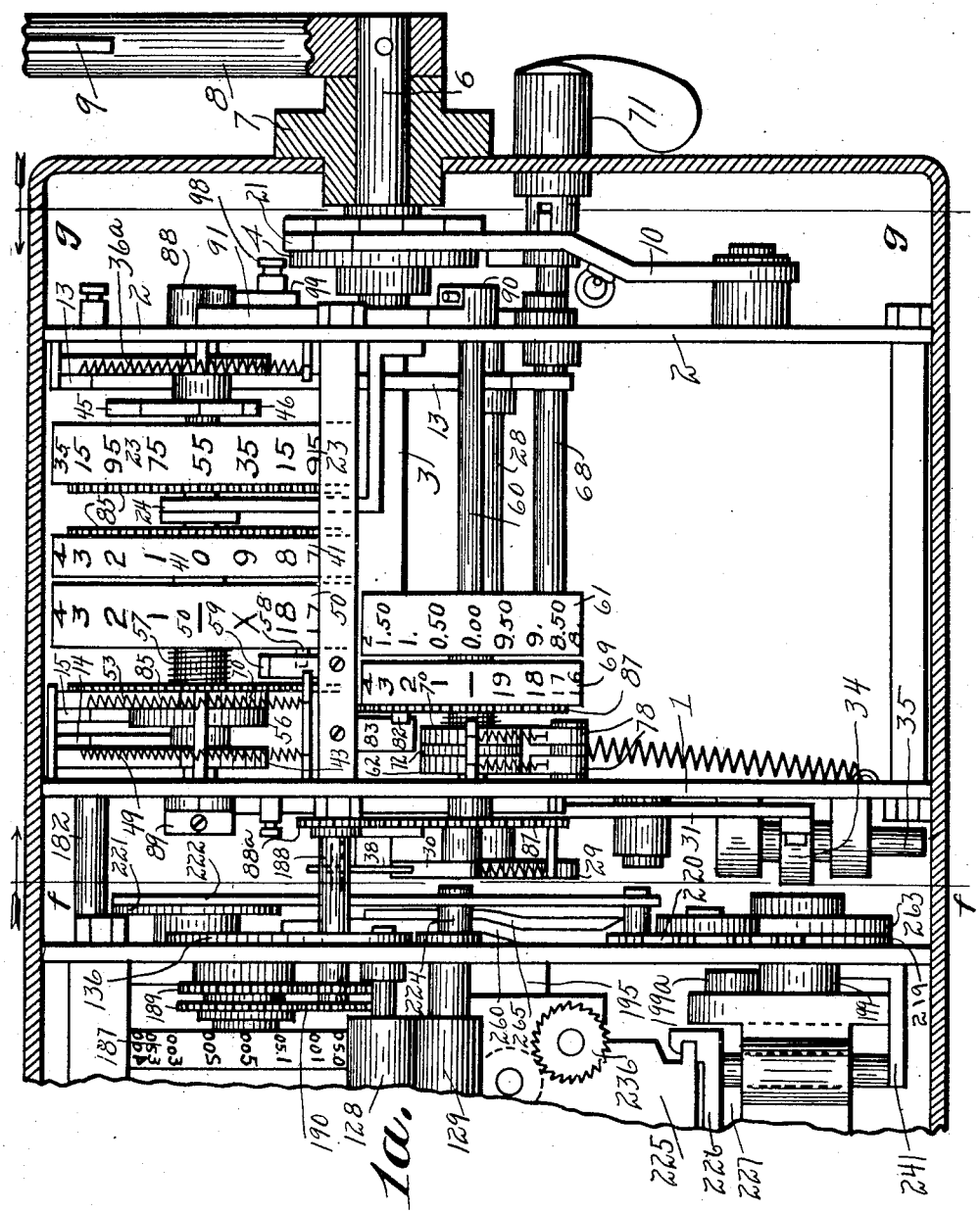

J. F. OHMER & E. H. BRIDENBAUGH.
TAXIMETER.
APPLICATION FILED NOV. 11, 1908.

1,223,067.

Patented Apr. 17, 1917.
12 SHEETS—SHEET 1.

WITNESSES.
M. Siebler.
C. M. Theobald.

INVENTORS.
Jno. F. Ohmer,
Elmer H. Bridenbaugh,
By R. J. McCarty
their attorney

J. F. OHMER & E. H. BRIDENBAUGH.
TAXIMETER.
APPLICATION FILED NOV. 11, 1908.

1,223,067.

Patented Apr. 17, 1917.
12 SHEETS—SHEET 2.

Witnesses
M. Siebler
C. M. Theobald.

Inventors
Jno. F. Ohmer
Elmer H. Bridenbaugh
By R. J. McCarty
their Attorney

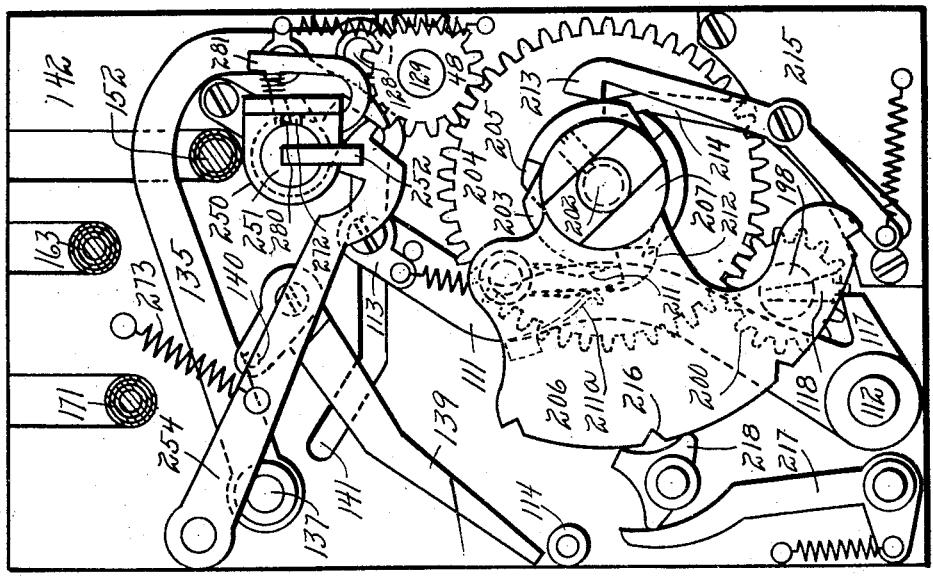
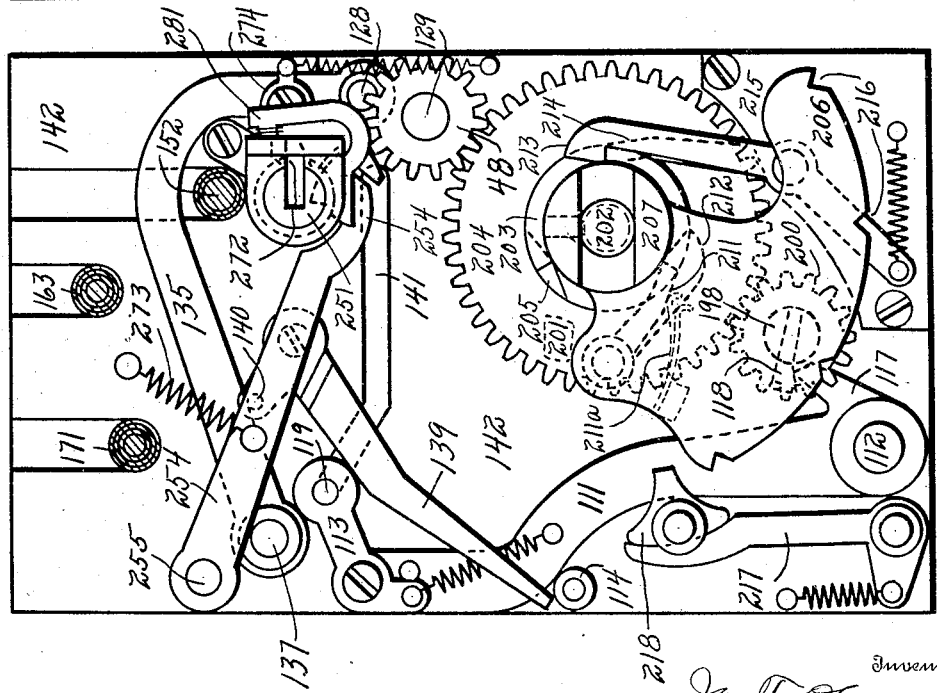

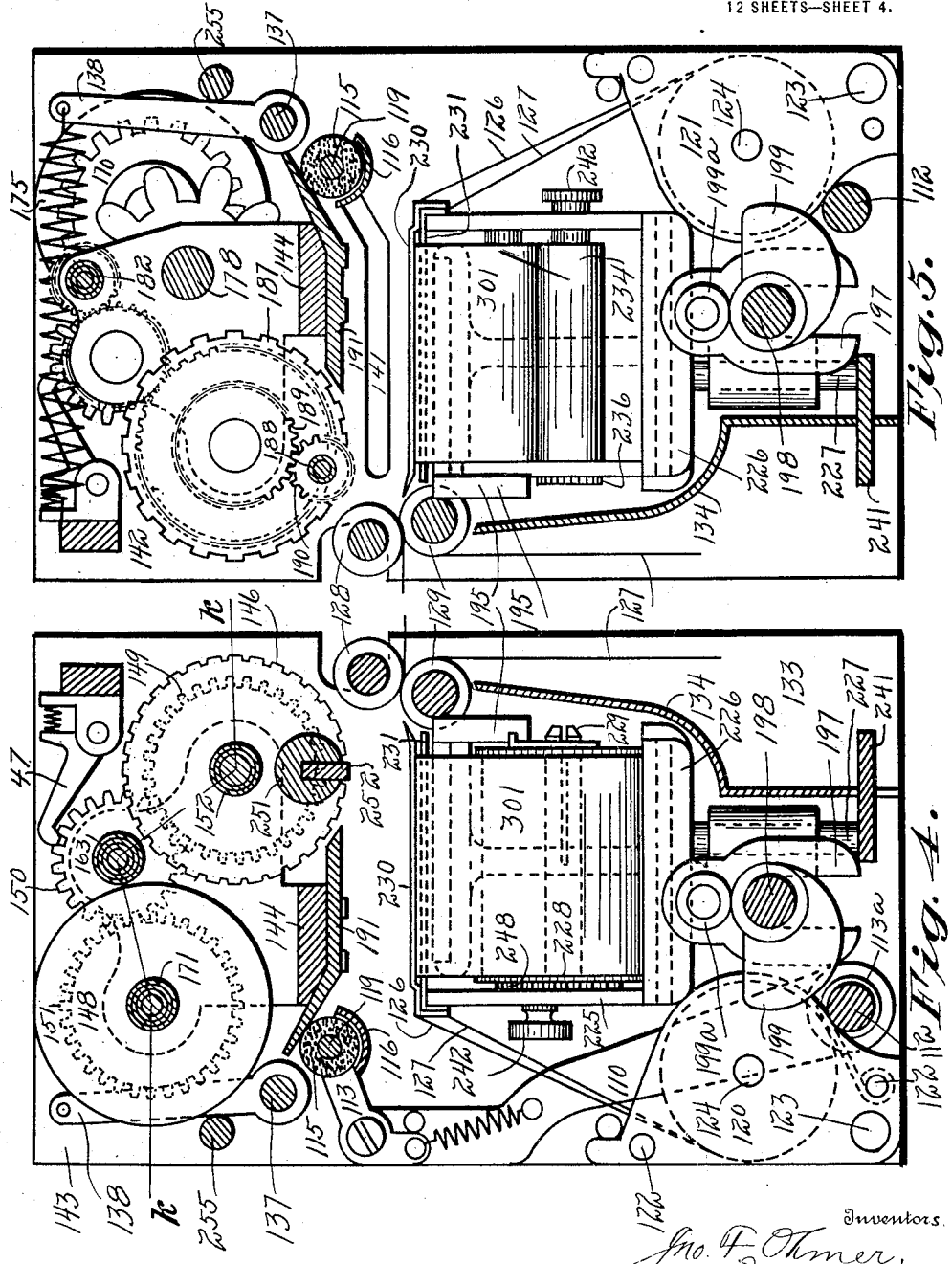

J. F. OHMER & E. H. BRIDENBAUGH.
TAXIMETER.
APPLICATION FILED NOV. 11, 1908.

1,223,067.
Patented Apr. 17, 1917.
12 SHEETS—SHEET 5.

| 425 | JUL | 23 | 1 36P | 2 41P | 7498 | 4395 | 31 50 |
|---|---|---|---|---|---|---|---|
| DRIVER | Mo. | DA. | Engaged | Discharged | Consct. No. | PrxAPayer | Suplmt. |

Societe Generale Des Compteurs De Voitures.    125

J. F. OHMER & E. H. BRIDENBAUGH.
TAXIMETER.
APPLICATION FILED NOV. 11, 1908.
1,223,067.
Patented Apr. 17, 1917.
12 SHEETS—SHEET 6.
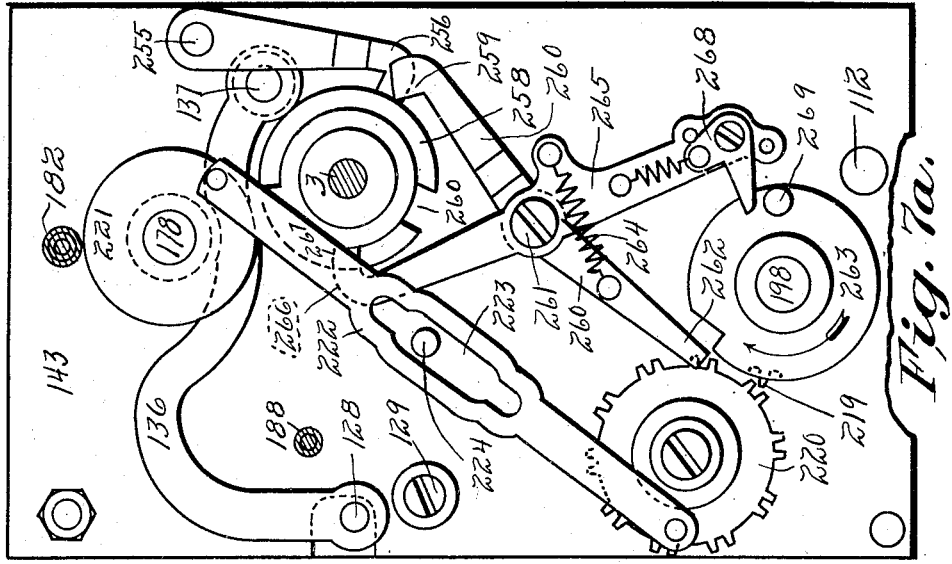
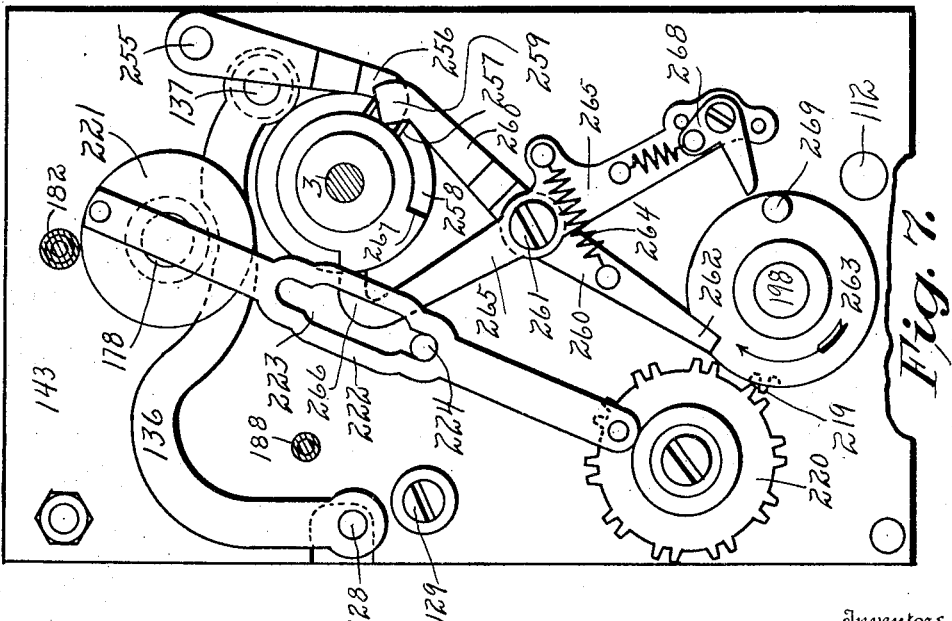
Witnesses
M. Siebler.
C. M. Theobald.
Inventors
Jno. F. Ohmer
Elmer H. Bridenbaugh
By R. J. McCarty
Attorney J. F. OHMER & E. H. BRIDENBAUGH.
TAXIMETER.
APPLICATION FILED NOV. 11, 1908.
1,223,067.
Patented Apr. 17, 1917.
12 SHEETS—SHEET 7.
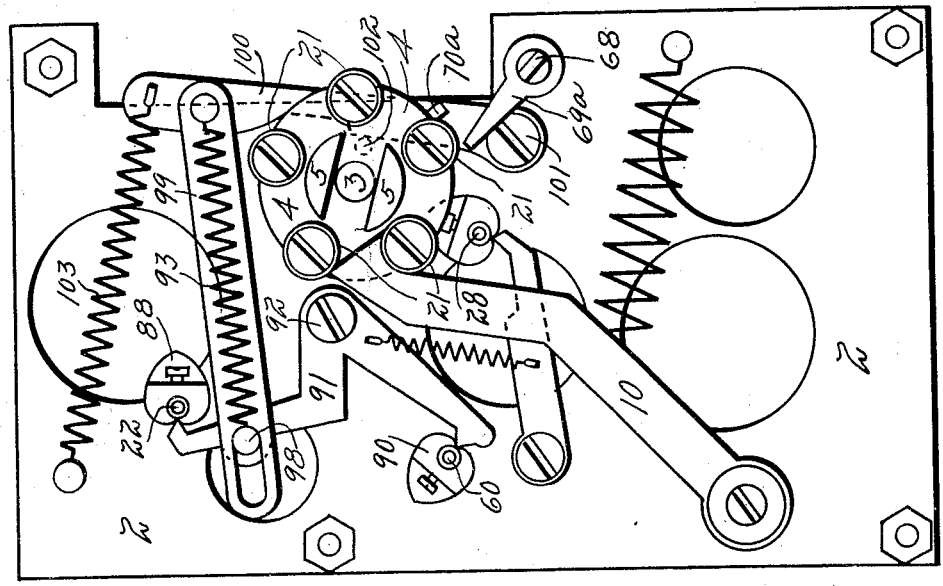
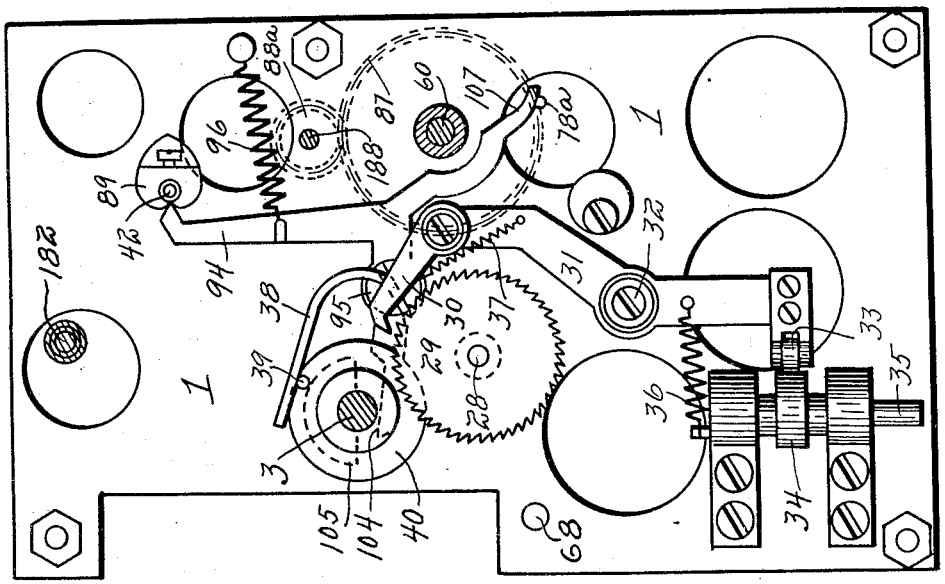
Witnesses
M. Siebler.
C. M. Theobald.
Inventors
Jno. F. Ohmer.
Elmer H. Bridenbaugh.
By R. J. M Canty
Attorney

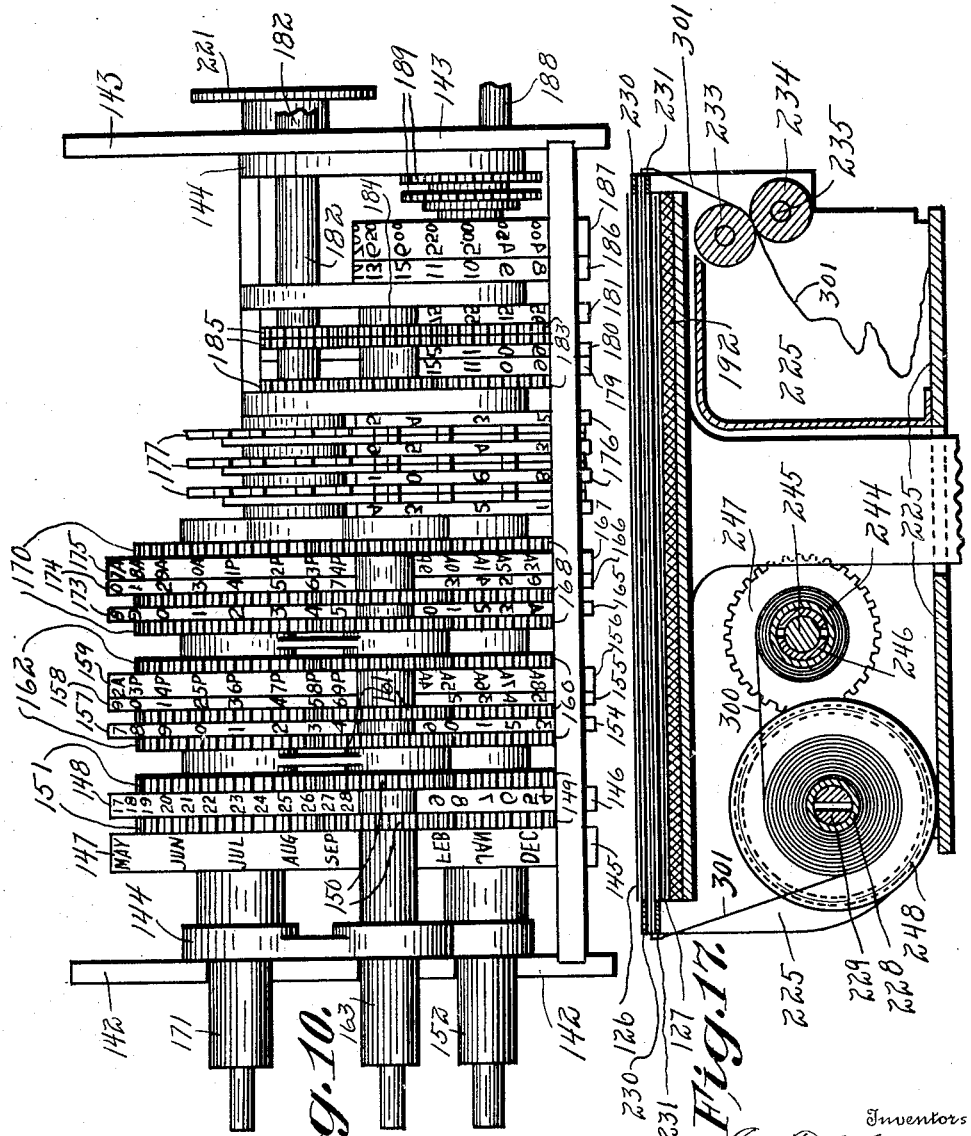

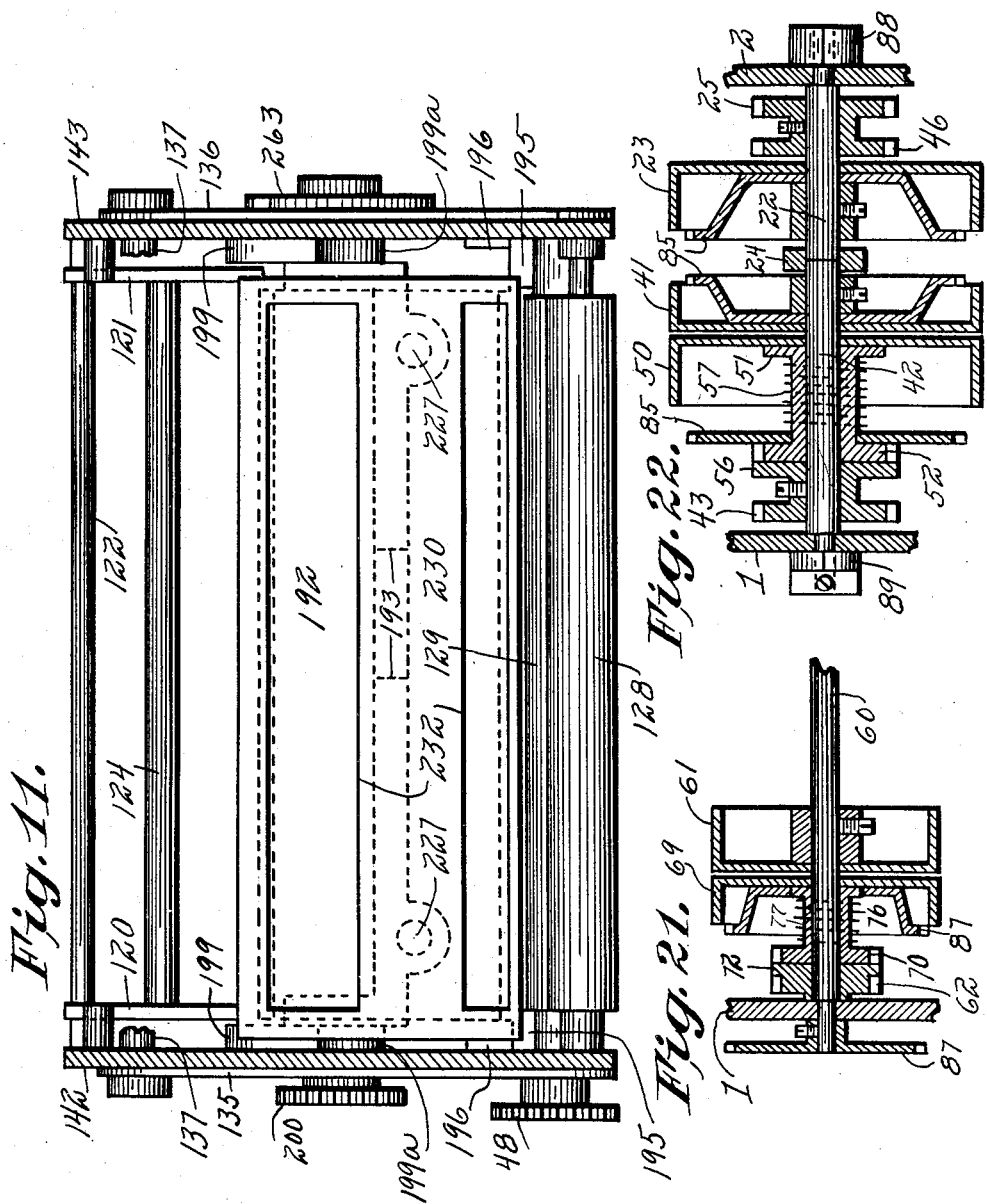

J. F. OHMER & E. H. BRIDENBAUGH.
TAXIMETER.
APPLICATION FILED NOV. 11, 1908.
1,223,067.
Patented Apr. 17, 1917.
12 SHEETS—SHEET 10.
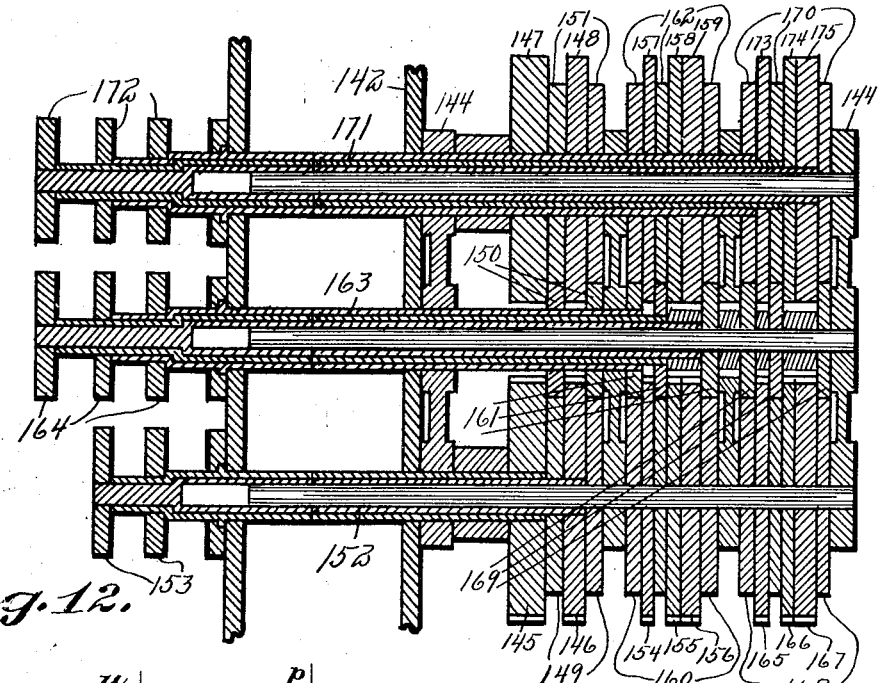
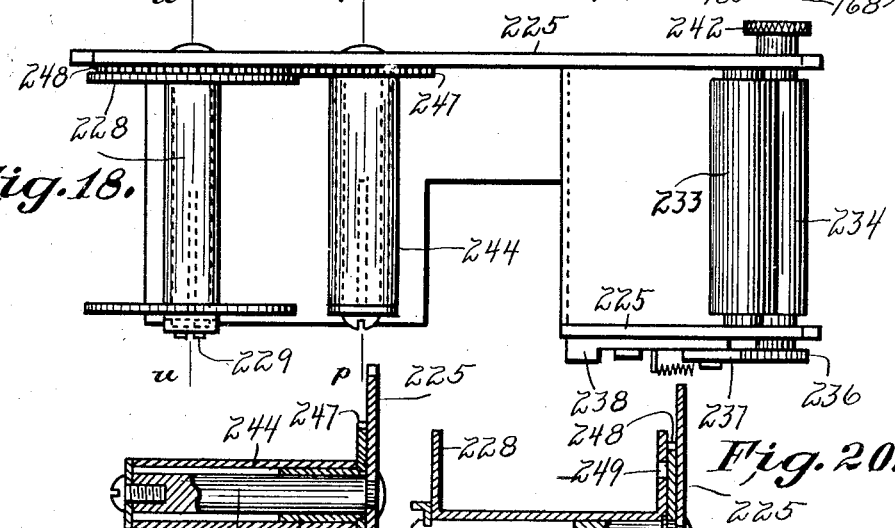
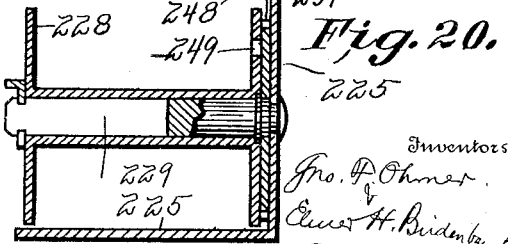
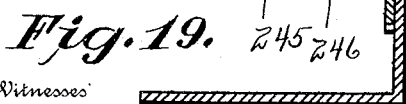

J. F. OHMER & E. H. BRIDENBAUGH.
TAXIMETER.
APPLICATION FILED NOV. 11, 1908.
1,223,067.
Patented Apr. 17, 1917.
12 SHEETS—SHEET 11.
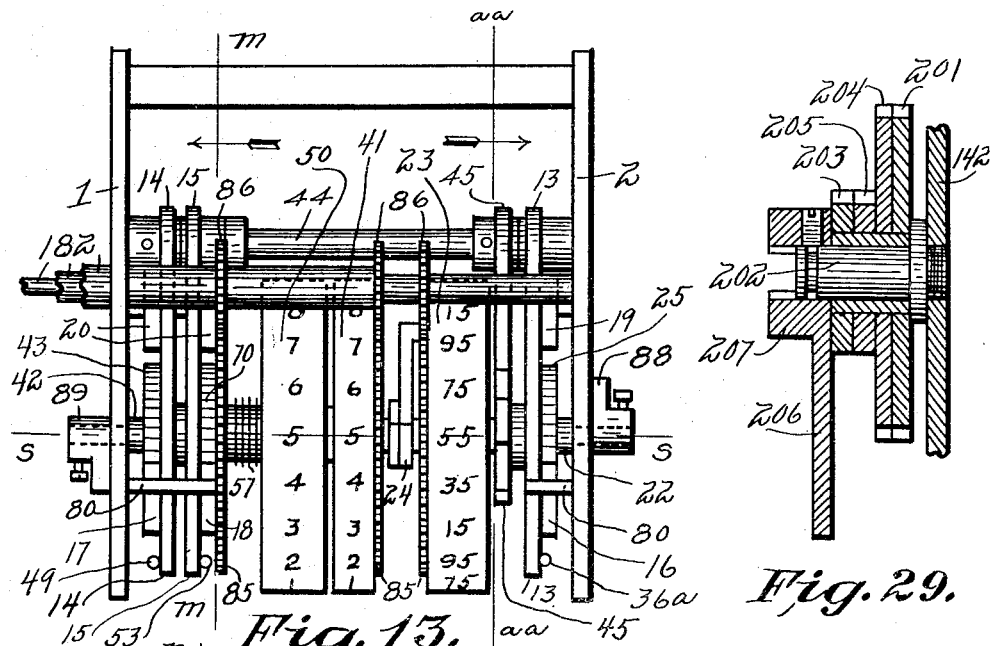
Fig. 13.
Fig. 29.
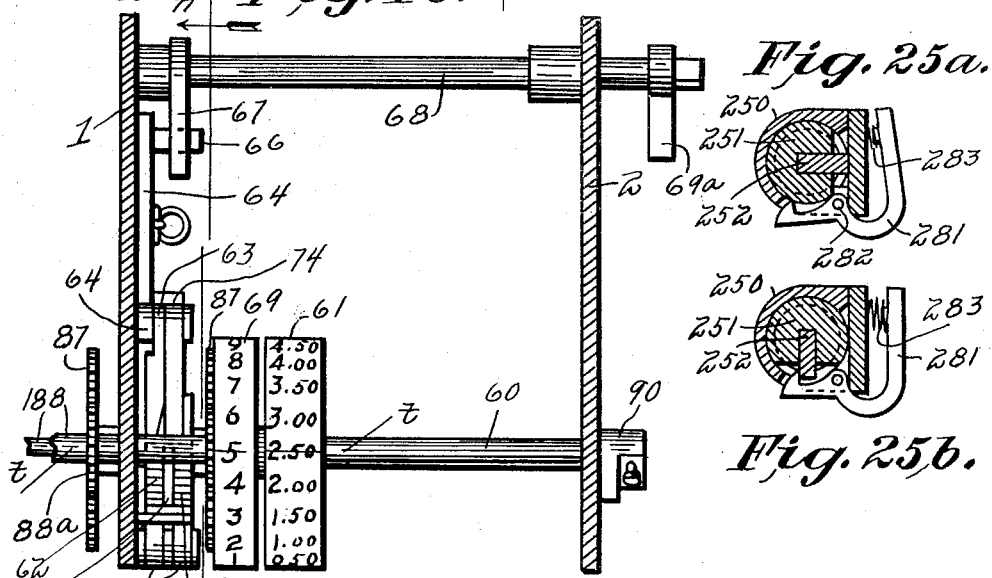
Fig. 14.
Fig. 25a.
Fig. 25b.
Witnesses
Inventors
Attorney

J. F. OHMER & E. H. BRIDENBAUGH.
TAXIMETER.
APPLICATION FILED NOV. 11, 1908.

1,223,067.

Patented Apr. 17, 1917.
12 SHEETS—SHEET 12.

UNITED STATES PATENT OFFICE.

JOHN F. OHMER AND ELMER HENRY BRIDENBAUGH, OF DAYTON, OHIO, ASSIGNORS TO OHMER FARE REGISTER COMPANY, OF ROCHESTER, NEW YORK.

TAXIMETER.

1,223,067.  Specification of Letters Patent.  Patented Apr. 17, 1917.

Application filed November 11, 1908. Serial No. 462,100.

*To all whom it may concern:*

Be it known that we, JOHN F. OHMER and ELMER H. BRIDENBAUGH, citizens of the United States, residing at Dayton, in the county of Montgomery and State of Ohio, have invented certain new and useful Improvements in Taximeters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in taximeters. A taximeter, as is well known, is a form of mechanism used in a public conveyance by means of which passengers are charged according to the distance of travel or the time consumed.

Owing to the fact that the driver has more or less control over the taximeter, there is much annoyance due to the disputes often arising between the driver and the passenger.

The object of the present invention is to provide means coöperatively associated with the taximeter, through and by which the authority of the driver is materially lessened so that the difficulty due to the aforesaid disputes is obviated.

The present invention broadly speaking, relates to means for printing upon a ticket to be given a passenger, and a record to be retained in the machine, the following data, to-wit: the time the passenger employed the cab or conveyance, and the time said employment is concluded or finished; the amount of the tariff or fare due for such period of employment; the date of the issuance of each ticket; the identification mark by means of which the driver is identified with each ticket issued and duplicate record thereof; the consecutive number of each ticket; and the sum or amount due for extra charges, such for example, as baggage, etc. It will not be necessary to go into a detail description of the taximeter independently of the present improvements, as it is well known that such device contains various counting wheels which are actuated by clock mechanism up to a certain or definite speed of the cab or conveyance, and after that speed has been exceeded, said counting wheels are operated by mechanism connected directly with the axle of the vehicle.

Preceding a detail description of the invention, reference is made to the accompanying drawings, of which—

Figures 6, 28:
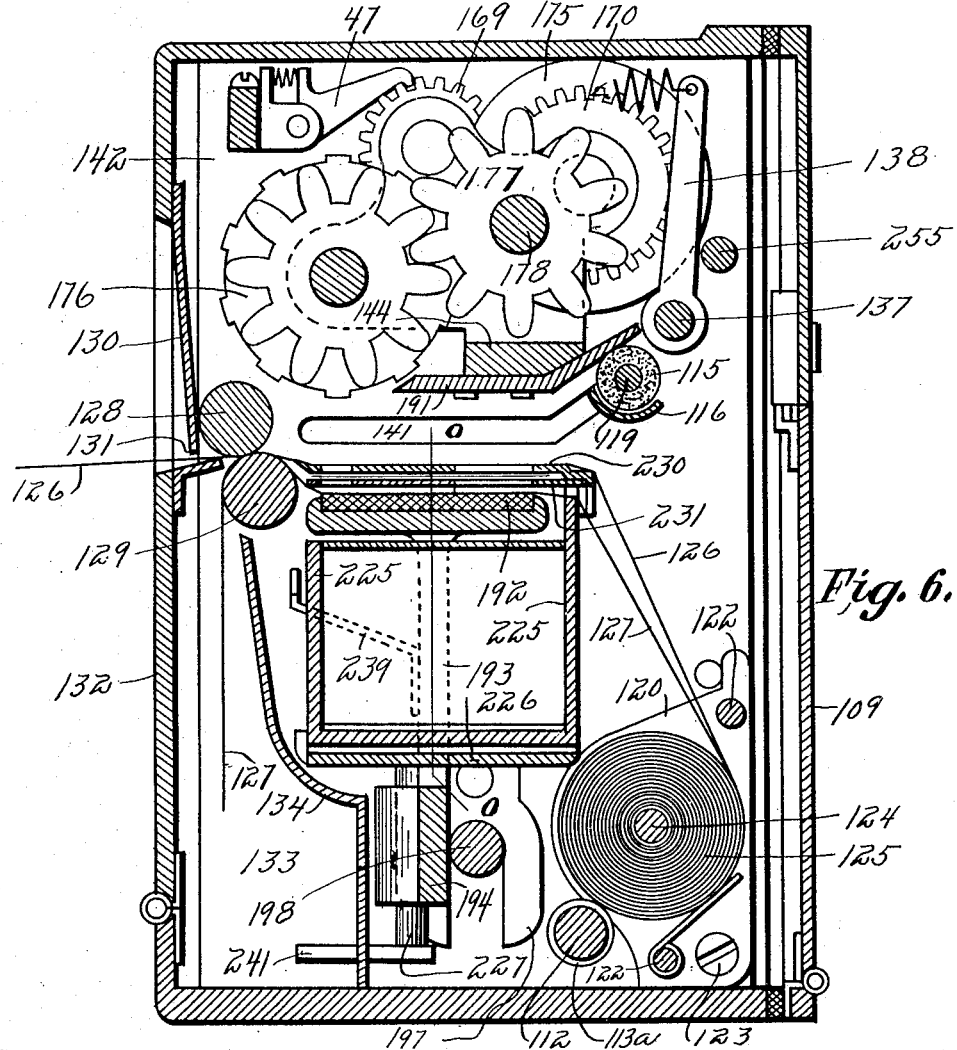
Figure 15:
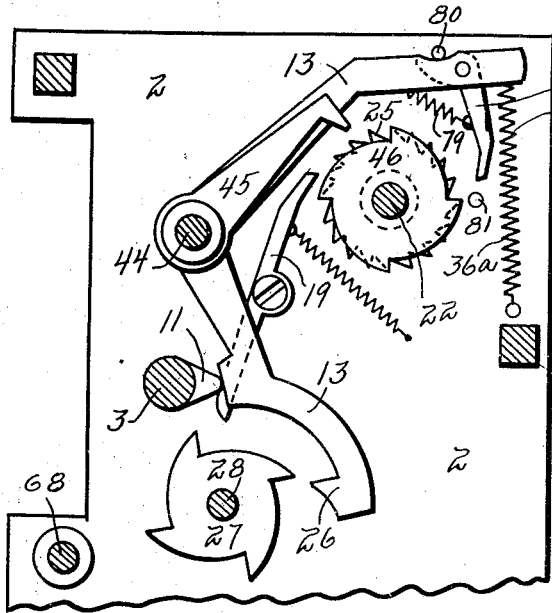
Figure 23:
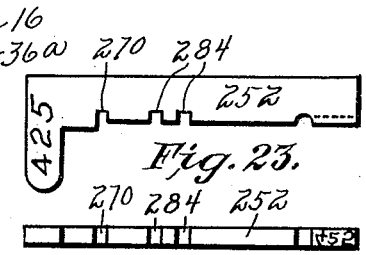
Figure 24:
Figure 25:
Figure 26:
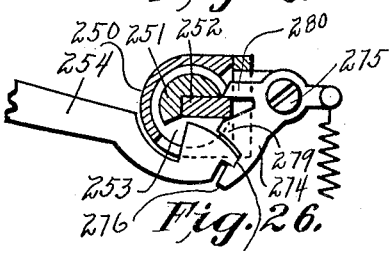
Figure 16:
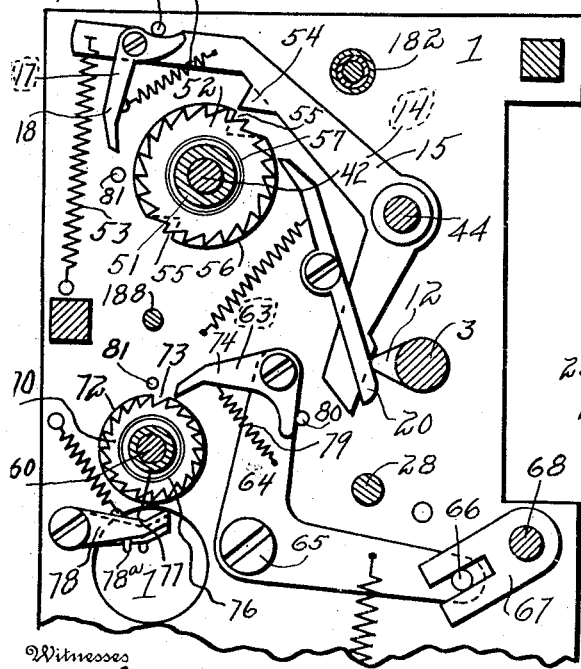
Figure 27:
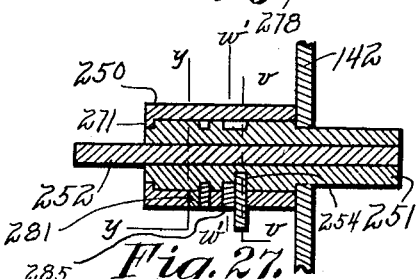
Figure 26A:
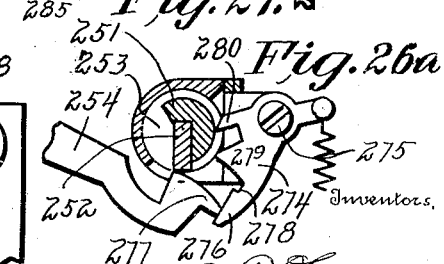

Figures 1 and 1ª, are elevations of opposite sides of the machine. Fig. 2, is a sectional view on the line $a$ $a$ of Fig. 1, the casing being removed. Fig. 3, is a section similar to Fig. 2, with the parts in different positions. Fig. 4, is a sectional view on the line $b$ $b$ of Fig. 1, the casing being removed. Fig. 5, is a sectional view on the line $d$ $d$ of Fig. 1, the casing being removed. Fig. 6, is a sectional view on the line $c$ $c$ of Fig. 1, the casing being removed. Fig. 7, is a sectional view on the line $e$ $e$ of Fig. 1, the casing being removed. Fig. 7ª, is a view similar to Fig. 7, the parts being in different positions. Fig. 8, is a sectional view on the line $f$ $f$ of Fig. 1ª. Fig. 9, is a sectional view on the line $g$ $g$ of Fig. 1ª. Fig. 10, is a top plan view of the type wheels. Fig. 11, is a top plan view of the impression mechanism. Fig. 12, is a sectional view on the line $k$ $k$ of Fig. 4. Fig. 13, is a top plan view of the tariff-indicating wheels and their transfer mechanism. Fig. 14, is a top plan view of the "supplemental" indicating wheels. Fig. 15, is a sectional view on the line $aa$ $aa$ of Fig. 13. Fig. 16, is a sectional view on the line $m$ $m$ and $n$ $n$ of Figs. 13 and 14. Fig. 17, is a longitudinal sectional view of the carbon box on the line $o$ $o$ of Fig. 6. Fig. 18, is a top plan view of the carbon box. Fig. 19, is a sectional view on the line $p$ $p$ of Fig. 18. Fig. 20, is a sectional view on the line $u$ $u$ of Fig. 18. Fig. 21, is a sectional view on the line $t$ $t$ of Fig. 14. Fig. 22, is a sectional view on the line $s$ $s$ of Fig. 13. Figs. 23 and 24, are views of the identification key by means of which the driver is identified with the tickets issued and the records thereof. Fig. 25, is a sectional view on the line $w'$ $w'$ of Fig. 27. Fig. 25ª, is a sectional view on the line $y$ $y$ of Fig. 1. Fig. 25ᵇ, is a view similar to Fig. 25ª, with the parts in different positions. Fig. 26, is a sectional view on the line $v$ $v$ of Fig. 27, and $w$ $w$ of Fig. 1. Fig. 26ª, is a view similar to Fig. 26, with the parts in different positions. Fig. 27, is a sectional view on the line x x of Fig. 25. Fig. 28, illustrates a ticket, such as is issued from the machine. Fig. 29, is a detail view of the printing and paper-feeding mechanism.

In the foregoing brief description of the various illustrations, Figs. 23 to 27 inclusive, illustrate various details and assembled parts of the mechanism through the instrumentality of which, the machine is unlocked, through the identification key.

As before stated, the present invention relates to various attached devices for printing tickets to be delivered to passengers, and duplicates thereof which constitute a stored record. The ticket so issued, will constitute a receipt in the hands of a passenger for the payment made. The mechanism comprised in the present invention may be applied to any taximeter now in use. It will be of course understood that the characters on the dials and printing wheels will be inscribed in language peculiar to the country in which the machines are used, for example, in France, the amount paid by the passenger for the time or mileage consumed will be indicated by centimes and francs; in England, by pennies, shillings, pounds, etc.

Proceeding now to a detail description of the invention, similar parts will be designated by similar reference characters.

*Taximeter mechanism proper.*

Figs. 8, 9, 15 and 16. Extending through the side plates 1 and 2 of the taximeter proper, is a shaft 3. At its right hand end, viewing Fig. 1ª, this shaft is provided with a disk 4 having a slotted boss 5. A short shaft 6 journaled in a bearing 7 engages this slotted boss 5, and on the outer end of this short shaft is mounted a crank 8 provided with an indicator 9 which bears the words "Fore hire" or "Libre." When this indicator 9 is up, the machine is locked and inoperative and the vehicle is not in hire. When the indicator 9 is down, the vehicle is in hire and the machine is unlocked and in an operative condition. The indicator 9 and the shaft 3 are held in their various positions by a spring-controlled pawl 10 engaging rollers 21 on the disk 4. The shaft 3 carries cams 11 and 12 which engage levers 13, 14 and 15 to disengage the ratchet pawls 16, 17 and 18 from their respective ratchets, the levers 13, 14 and 15 are shown in this position in Figs. 15 and 16. The pawls 16, 17 and 18 being free from their ratchets, allow the counters of the taximeter, presently again referred to, to be freely returned to zero. The cams 11 and 12 also disengage the retaining pawls 19 and 20 from their respective ratchets.

Mounted upon a short shaft 22 is an indicating centime wheel 23 of the fare counter. (See Figs. 1ª, 13, 15 and 22.) This shaft is journaled in the side plate 2, and a bracket 24, and is provided with a ratchet 25 which is engaged by the pawl 16 on the lever 13 for the centime wheel 23. The ratchet 25 is provided with twenty teeth to agree with the twenty indications on the centime wheel 23. When the cam 11 releases the lever 13, it allows the pawl 16 to come in contact with the ratchet 25. This movement of the cam 11 also allows the end 26 of the lever 13 to come in contact with the cam 27; it is this cam 27 that allows the lever 13 to be rocked by the spring 36ª to rotate the ratchet 25 and thereby the centime wheel 23 through the pawl 16, see Fig. 15. The cam 27 is mounted on a shaft 28 journaled in the plates 1 and 2. On the left hand end of said shaft, is provided a ratchet 29 which is engaged by a pawl 30 on a lever 31—see Fig. 8. The ratchet 29 drives the cam 27 which is on the same shaft therewith, to-wit, shaft 28. The lever 31 is pivoted at 32, and on its lower end carries a roller 33 which is engaged by a cam 34 which rocks said lever 31. The cam 34 is on a shaft 35 which is connected to one of the wheels of the vehicle by a flexible shaft (not shown). The flexible shaft is a well-known feature of the taximeter, the same being employed for transmitting movement from an axle of the vehicle to the counters of the taximeter. The roller 33 is kept in contact with the cam 34 by a spring 36. The pawl 30 is normally held in contact with the ratchet 29 by the spring 37 and is disengaged from said ratchet by an arm 38 being engaged by a pin 39 on a disk 40 on the shaft 3. The pin 39 and cam 12 permit the pawls 30, 16, 17 and 18 to be disengaged from their respective ratchets to permit the respective counters and the cam 27 to be reset to normal position. When the pawl 30 is disengaged from the ratchet 29, the machine is inoperative and the indicator 9 is in its upper or exposed position. The centime wheel 23 is provided with characters 15, 35, 55, 75 and 95, representing French money in denomination known as centimes, and this series of figures is repeated four times. Upon each one-fourth revolution of this centime wheel, a franc is registered on the unit franc wheel 41. This unit franc wheel is rigidly secured to a shaft 42 mounted in the side plate 1 and the bracket 24, see Fig. 22. Also rigidly secured to the shaft 42, is a ratchet 43 which is engaged by the pawl 17 on the lever 14 which is for the unit franc wheel 41. (See Figs. 13, 16 and 22.) The lever 14 is rigidly secured to a shaft 44 journaled in the plates 1 and 2. See Figs. 13 and 15. An arm 45 is also rigidly secured to said shaft 44 and is adapted to engage the cam 46 which is rigidly secured to the ratchet 25 of the centime wheel 23. (See Fig. 15.) The arm 45 engages a cam 46 when the lever 14 is released by the cam 12, and when the end of the arm 45 rides off the shoulders on the cam 46, the shaft 44 and the lever 14 will be rocked by a spring 49 on lever 14. See Fig. 13. The spring 49 is in the rear of spring 53 shown in Fig. 16. This allows the pawl 17 to rotate the ratchet 43, shaft 42 and the unit franc wheel 41. The unit franc wheel 41 is provided with characters 0 to 9, the series being repeated twice, and upon each half revolution of said wheel, the value of ten francs is transferred to the tens and hundreds franc wheel 50. This wheel 50 is mounted on a hub 51 and rotates freely on the shaft 42. On the hub 51 is a ratchet 52 adapted to be engaged by the pawl 18 on the lever 15. See Figs. 22 and 16. The lever 15 for the tens and hundreds franc wheel is freely mounted on shaft 44 and is actuated to rotate the ratchet 52 of wheel 50 by a spring 53 on said lever, and is released by the projection 54 on lever 15 entering recesses 55 in the disk 56 which is rigidly attached to the ratchet 43 and has two recesses 55 to correspond to the half revolution of the unit franc wheel 41. The wheel 50 and ratchet 52 are held in the position to which they are rotated by the pawl 20, see Fig. 16. When said pawl 20 is released from the ratchet 52, a spring 57 will return said wheel 50 and said ratchet 52 to zero. A stop 58 is provided on the wheel 50 which engages a projection 59 to limit the return movement of said wheel 50 and to hold the same in zero position, see Figs. 1ª and 22. The above mechanism indicates the fare to be paid. As illustrated and described, this mechanism is driven from one of the wheels of the vehicle in a well known manner. It will also be understood that said mechanism may be made to operate by clock mechanism or by both as they are both well-known features of the taximeter.

Mounted below the above-described mechanism, is a supplemental counter for indicating the price for extras, such as baggage, etc. 61 is a unit and a fraction of a unit franc wheel. This wheel registers whole francs and half francs and is rigidly secured to a shaft 60; this shaft 60 has bearings in the plates 1 and 2 and is provided with a ratchet 62 adapted to be engaged by a pawl 63 on a bell crank lever 64. See Fig. 16. The lever 64 is pivoted at 65 and receives movement from the slotted crank 67 engaging a pin 66. The crank 67 is secured to the shaft 68 which has bearings in the plates 1 and 2. The shaft 68 is rocked by a finger-piece 71 journaled in and extending on the outside of the casing. The inner end of the finger-piece 71 has a slot that is engaged by the flat end of the shaft 68—see Fig. 1ª. The shaft 68 is provided with an arm 69ª which engages the pin 70ª on the disk 4 when the indicator 9 is up, thereby rendering the supplemental counter inoperative—see Fig. 9. The unit wheel 61 is provided with twenty characters representing 0 to 9.50 francs. Upon each revolution of said unit wheel 61 ten francs are registered on the tens and hundreds wheel 69. 72 indicates a disk rigidly secured to the ratchet 62 and containing a notch or depression 73. See Fig. 16. At the side of the disk 72 is a ratchet 70 rigidly secured to the gear 87 and the wheel 69. See Fig. 21. 74 is a pawl pivoted on the bell crank lever 64 and of such a width that it may engage both the disk 72 and the ratchet 70. See Fig. 16. When the end of the pawl 74 comes opposite the notch 73, said end will drop into said notch and into one of the teeth of the ratchet 70, and when the bell crank lever 64 is rocked, ten francs will be registered on the wheel 69. The ratchets 62 and 70 are provided with retaining pawls 78. The pawls 16, 17, 18, 63 and 74 are normally held in contact with their respective ratchets by springs 79, but when the levers carrying said pawls are in their upper position, the pawls are held away from the ratchets by pins 80. See Figs. 15 and 16. To prevent an overthrow of the ratchets 25, 43 and 52, pins 81 are provided which force the pawls into the teeth of their respective ratchets, see Figs. 15 and 16, thereby preventing a further rotation of said ratchets. The wheel 69 is returned to zero by a spring 76, and a stop 82 is mounted on said wheel which engages a projection 83 to hold said wheel in a zero position. Fig. 1ª.

We have hereinbefore described how the wheels 50 and 69 are returned to zero by the springs 57 and 76. The other wheels 23, 41 and 61 are returned to zero by means of heart-shaped cams, which are a well-known expedient in taximeters. Mounted on the ends of shafts 22, 42 and 60 are the heart-shaped cams 88, 89 and 90,—see Figs. 8 and 9. The cams 88 and 90 are engaged by the lever 91 pivoted at 92 and controlled by spring 93. The cam 89 is engaged by the lever 94 pivoted at 95 and controlled by spring 96. When the retaining pawls 19, 20 and 78 release their respective ratchets by means of the cams 11 and 12, the respective levers of the heart-shaped cams engage said cams and return the wheels 23, 41 and 61 to zero. If said wheels have made less than one revolution in counting, they rotate in one direction to zero, but if they make more than a half revolution, they revolve in the opposite direction. To allow the wheels to revolve freely when counting, the levers 91 and 94 are disengaged from the respective heart-shaped cams. The lever 91 carries a pin 98 which is engaged by a push rod 99 attached to a lever 100 pivoted at 101. See Fig. 9. A pin 102 on the disk 4 engages this lever, and when the disk 4 is rotated to place the machine in operation, the pin 102 releases the lever 100 thereby allowing the spring 103 to rock said lever and disengage the lever 91 from the cams 88 and 90. The lever 94 has a projection 104 which is engaged by a cam 105 on a disk 40 on shaft 3. See Fig. 8. The lever 94 also has a projection 107 that engages projection 78$^a$ of the retaining pawls 78 to free the ratchets 62 and 70, and allow the supplement indicating wheels 61 and 69 to rotate to zero. See Figs. 8 and 16.

*Printing wheels.*

Mounted between the plates 142 and 143 is a frame 144 which supports the printing wheels, indicating wheels and their driving gears. See Figs. 1 and 10. At the left hand side of the frame 144 facing the machine, is placed the month printing wheel 145 and the day printing wheel 146. These wheels are geared to the month and day indicating wheels 147 and 148 by gears 149, 150 and 151. See Figs. 1 and 12. These indicating and printing wheels are rotated by means of the telescopic shafts 152 which project through the casing and are provided with finger-knobs 153. See Fig. 1. To the right of the month and day wheels are the "engaging" time printing wheels 154, 155 and 156; said wheels are geared to the "engaging" time indicating wheels 157, 158 and 159 by the gears 160, 161, and 162. See Fig. 10. These wheels indicate and print the time when the vehicle is engaged, and said wheels are rotated by means of the telescopic shafts 163 which project through the casing and are provided with knobs 164. See Fig. 1. To the right of the "engaging" time wheels are the "disengaging" time printing wheels 165, 166 and 167; these wheels are geared to the "disengaging" time-indicating wheels 173 and 174 and 175 by the gears 168, 169 and 170. See Fig. 10. These wheels indicate and print the time when the vehicle is discharged; the said wheels are rotated by means of the telescopic shafts 171 which project through the casing and are provided with knobs 172. See Figs. 1, 10 and 12. The "engaging" time wheel 156, and the "disengaging" time wheel 167, are provided with two series of characters, one series having the letter A and the other having the letter P. This is to differentiate between the a. m. and p. m. hours. See Fig. 10. All of the printing and indicating wheels are held in alinement by spring-controlled pawls 47 engaging the gears 149, 157 and 168. See Fig. 4.

To the right of the "disengaging" time wheels 165, 166 and 167 is a consecutive counter consisting of wheels 176. This counter may be of the one tooth transfer or any other type, and is provided with transfer wheels 177; see Fig. 6. It is operated through the shaft 178 by the printing or impression mechanism hereinafter more fully described. To the right of said consecutive counter are placed the fare printing wheels 179, 180 and 181 which are geared to the telescopic shafts 182 by gears 183, 184 and 185, and rotate concurrently with the fare-indicating wheels 23, 41 and 50 of the taximeter proper. See Figs. 10 and 13. The indicating wheels 23, 41 and 50 of the taximeter are provided with gears 85 and are geared to telescopic shafts 182 by gears 86. It will thus be seen that the printing wheels 179, 180, and 181 will rotate concurrently with the indicating wheels 23, 41 and 50. To the right of the fare-printing wheels are the supplement printing wheels 186 and 187 which print the cost of carrying baggage or supplements. See Fig. 10. These wheels are mounted telescopically and are geared to the telescopic shafts 188 by means of gears 189 and 190. See Fig. 5. The printing wheels 186 and 187 rotate concurrently with the supplement-indicating wheels 61 and 69 of the taximeter proper. The indicating wheels 61 and 69 of the taximeter are provided with gears 87 which are geared to the telescopic shafts 188 by gears 88$^a$. See Figs. 8 and 14. It will thus be seen that the taximeter indicating wheels 61 and 69 will rotate concurrently with the printing wheels 186 and 187.

Mounted on the bottom of the frame 144 is a type plate 191; see Figs. 4, 5 and 6; this type plate prints on the ticket, such as the name of the company operating the machine, the title of the different indications, and the number of the machine, etc. In this case, the number of the machine is 125. See Fig. 28.

*Printing mechanism.*

Mounted below the printing wheels above described, is a platen 192 supported on a standard 193, said standard projecting from a cross-piece 194. See Figs. 1 and 6. This platen is held in a horizontal position by projections 195 thereon engaging the shaft of the upper feed roller 128, (see Fig. 11) and the guides 196 on the side plates 142 and 143, together with the bifurcated ends 197 of the cross-piece 194 straddling the shaft 198. See Figs. 1, 6, 11 and 17. The platen 192 is given ascending movement to print, by the cams 199 on the shaft 198 engaging rollers 199$^a$, said shaft being rotated through gear 200 from gear 201. See Figs. 2 and 29. This gear 201 is mounted on a stud 202 and is provided with a ratchet 203; the stud is mounted on the plate 142, and in addition to the gear 201 and the ratchet 203, it carries a gear 204, ratchet 205 and a plate 206, said plate having a slotted boss 207 thereon. The gear 204 and the ratchet 205 are part of the paper-feeding devices and will be hereinafter described. See Fig. 29. The boss 207 is engaged by a short shaft 208 mounted in a bearing 209 attached to the casing. See Fig. 1. On the other end of this shaft is a crank arm 210 by which the plate 206 is rocked to take a print or impression and to feed the paper. The plate 206 carries two spring-controlled pawls 211 and 212, the pawl 211 engages the ratchet 203, and when the plate 206 is rocked, the gear 201 is rotated one-third of a revolution, thereby giving the gear 200 and the shaft 198 one complete revolution, the gears having a three to one ratio. See Figs. 2 and 3. On the return movement of the plate 206, the pawl 212 engages the ratchet 205, thereby giving the gear 204 a third of a revolution to feed the paper in a manner hereinafter more fully described. The gears 201 and 204 rotate in opposite directions and their ratchets 203 and 205 are provided with retaining pawls 213 and 214 mounted on a plate 215. See Figs. 2 and 3.

The outer edge of the plate 206 has notches 216 which are engaged by a pawl 218 controlled by an arm 217. See Fig. 2. This is a well-known full stroke mechanism employed to prevent a short stroke being given the crank arm 210. On one end of the shaft 198 is a one-tooth gear 219 which is in mesh with a Swiss gear 220. See Fig. 7. One complete revolution of the gear 219 imparts one-tenth of a revolution to the gear 220; the gear 220 is connected to a disk 221 mounted on the consecutive counter-printing shaft 178 by a pitman 222 which has a slot 223 straddling a pin 224 on plate 143. It will be seen that upon each tenth of a revolution of the Swiss gear 220, one-tenth of a revolution will be imparted to the consecutive counter-operating shaft 178, and one unit will be registered on the consecutive counter. See Figs. 7 and 7ª.

*Carbon paper box,* (Figs. 1 and 6.)

Below the platen 192 is a carbon box 225 slidingly mounted on a plate 226, to permit said box to be removed through the door 109 in the back of the casing. The plate 226 is provided with pins 227 which project through bosses on the cross arm 194. The carbon box is normally carried by the platen, but a certain amount of free movement is allowed it to provide for the feeding of the carbon paper therefrom. The carbon paper 301 is wound on a spool 228 mounted on a stud 229 in said box, and said stud is slotted to provide a certain amount of friction between the spool and the stud to prevent the carbon paper from overrunning. See Figs. 17, 18 and 19. The carbon paper 301 after leaving the spool passes upwardly and between plates 230 and 231 mounted on a side of the carbon box, and provided with openings 232 which permit the type on the printing wheels to come in contact with the platen, see Fig. 6.

The thicknesses of the plates 230 and 231 are exaggerated somewhat in the drawings, in order to more clearly illustrate said plates. The carbon paper passes downwardly from said plates and between feed rollers 233 and 234. See Fig. 17. The shaft 235 of the feed roller 234 is provided with a ratchet 236 engaged by a spring-controlled pawl 237 mounted on the spring-controlled lever 238 pivoted at 243 and engaged by the bracket 239 attached to the standard 193. See Fig. 1. When the platen ascends, it engages the plates 230 and 231, thereby carrying the carbon box upwardly, but said platen ascends a certain distance before engaging said plates 230 and 231; this free movement of the platen allows the bracket 239 to release the lever 238, and said lever being under the influence of the spring 240, the pawl 237 will rotate the ratchet 236 to feed the carbon paper 301. This feeding movement of the carbon paper occurs at the taking of each print or impression from the printing wheels. The downward movement of the carbon box is arrested by the pins 227 engaging the brackets 241. See Fig. 1. The end of the shaft 235 opposite the ratchet 236 is provided with a finger-piece 242 by means of which the carbon paper-feeding rollers 233 and 234 may be rotated by hand. See Figs. 4 and 18. When the carbon paper 301 is wound upon the spool 228, it is separated by a continuous ribbon of thin paper 300, which prevents the carbon substance rubbing off onto the back of the carbon paper 301. See Fig. 17. The paper 300 is wound around a cylinder 244 mounted upon a stud 245. Mounted between the stud 245 and cylinder 244, is a slotted shaft 246 which carries a gear 247 meshing with a gear 248 which is rotated from the spool 228 by a pin 249. See Figs. 17 and 20.

It will be seen from Figs. 17, 19 and 20, that when the carbon paper 301 is unwound from the spool 228, the separating paper 300 will wind upon the cylinder 244. The shaft 246 being slotted, provides a frictional contact between the cylinder 244 and said shaft, whereby the varying feeding movement due to the decreasing size of carbon roll and the decreasing size of the separating paper 300 is taken care of.

*Inking devices.*

Figs. 4 and 5. The shape of the cam 199 allows the shaft 198 to rotate about one-fourth of a revolution before the platen 192 begins to ascend. During this dwell, the inking mechanism is actuated; this mechanism is as follows: Mounted on the inner side of the plate 143, is an arm 110, and on the outside of the plate 142 is an arm 111, both of which arms are attached to a shaft 112 mounted in the plates 142 and 143. These arms are normally held in the position shown in Figs. 2 and 4, by a spring 113ª and are retained by a stop 114. The upper ends of said arms carry spring-controlled levers 113 which carry the inking roller 115. A guard 116 is mounted below the inking roller to prevent said inking roller from soiling the paper strip 126 upon which the tickets are printed. The outer arm 111 has a projection 117 which is adapted to be engaged by a projection 118 on the shaft 198. See Figs. 2 and 3.

As before stated, the gear 201 is rotated by the crank arm 210 during the first or downward movement of said crank arm, and during its initial movement, the arms 110 and 111 will be rocked from the position shown in Fig. 2 to that shown in Fig. 3.

This movement carries the inking roller 115 under the type plate 191 and the printing wheels thereby inking the same. When the projection 117 is released by the projection 118, the spring 113ª moves the inking roller back to its normal position. The arm 111 being on the outside of the plate 142, and the inking roller being on the inside of said plate, a slot 141 is provided in said plate to permit the shaft 119 of the inking roller to project through said plate and connect with said arm.

Paper-feeding mechanism.

Mounted in the lower portion of the machine between the plates 142 and 143 and in the rear of said machine, is a paper-carrying frame consisting of side plates 120 and 121 and tie bars 122; said frame is pivoted at 123—123 to said side plates. See Figs. 4, 5, 6 and 11. A rod 124 is mounted loosely in the plates 120 and 121 and supports the roll of paper 125 from which the tickets and records are obtained. A spring-controlled friction piece presses against the roll of paper and prevents the same from overrunning. The roll of paper is wound double as shown in Fig. 6, the outer and upper web 126 furnishing the printed ticket see Fig. 28, and the inner and under web 127 furnishing the carbon copy. The web 126 passes over the plate 230, and the web 127 passes under the plate 231 and over the platen 192. The carbon paper 301 lies between the two webs of paper, and both webs pass through feed rollers 128 and 129; web 126 passing out of the machine through an opening formed by a plate 130 having a knife edge 131, and the upper portion of the door 132, and the web 127 furnishing the carbon copy, passing into the compartment 133 formed by the plate 134 and the door 132. The lower feed roll 129 is the actuating roll and is journaled in the plates 142 and 143, and is provided with a gear 48 which meshes with a gear 204 before referred to. See Fig. 2. When the plate 206 is on its return movement, the pawl 212 will engage the ratchet 205, thereby rotating the gears 204 and 48 and said feed roller 129 to feed the paper.

The upper roll 128 is journaled in the arms 135 and 136 on the outside of the plates 142 and 143, said arms being attached to a shaft 137 journaled in the plates 142 and 143. An arm 138 is mounted in the center of the shaft and is provided with a spring which holds the two rollers 128 and 129 in contact. In order to separate said rollers to allow the insertion of the webs 126 and 127, an arm 139 is pivoted to the plate 142, and said arm carries a pin 140 which engages the arm 135 when it is desired to separate the feed rollers; the lower end of the arm 139 is elevated, the pressure of the pin 140 against the arm 135 will then rock the shaft 137 and thereby elevate the upper feed roller allowing the insertion of the webs of paper.

Locking devices.

This locking mechanism compels the driver of the cab or conveyance to perform certain operations, none of which can be performed in advance of the other. See Figs. 2, 3, 7, 23 and 27. First, a key termed an "identification key" must be inserted and given a quarter turn; second, the indicator 9 hereinbefore referred to must be lowered; third, the printing mechanism must be operated; and fourth, the said indicator must be returned to its upper position before a second ticket can be issued.

Mounted on the side plate 142 is a housing 250 which carries a cylinder 251 having a slot in which the driver's identification key 252 is inserted and afterward given a quarter turn to unlock the machine. See Fig. 2. The inner end of this key is provided with type which engage the webs of paper, when said key is in a vertical position with the type downward. See Figs. 26 and 26ª. The cylinder 251 has another slot 253 in which the end of the lever 254 rests, and when said cylinder is rotated by the key 252, said key will engage the end of said lever and will rock the shaft 255 upon which said lever is mounted,—see Figs. 2, 3, 26 and 26ª. The shaft 255 is mounted in the plates 142 and 143, and on its right hand end it carries an arm 256. See Fig. 7. When the key 252 is in a horizontal position, the lower end of this arm rests in a notch 257 of a dial or disk 258, and the machine is locked as the disk 258 is carried on one end of the main setting shaft 3. A spring 273 holds the end of the arm 256 in the notch 257. See Fig. 2. When the key 252 is rotated a quarter turn, the machine is unlocked and the indicator 9 may be lowered thereby placing the machine in an operative condition.

The object of the above-described mechanism is to prevent the driver starting the machine without inserting his key.

Normally resting in the notch 257 of the disk 258 is the end 259 of a lever 260 controlled by a spring 264 and fulcrumed at 261; the lower end 262 of said lever rests in a notch in a dial or disk 263, see Figs. 7 and 7ª. The disk 263 is mounted upon the end of the printing shaft 198. When the indicator 9 is up, the printing mechanism will be locked, and when said indicator is down, said printing mechanism is unlocked. The object of the above mechanism is to prevent the issuing of a ticket without first placing the machine in an operative position by raising the indicator 9 to show that the machine is in such condition. To prevent the placing of the machine in an inoperative condition before the issuing of a ticket, the following mechanism is provided.

Also mounted on the pivot 261 is a lever 265, the upper end 266 of which is adapted to engage a shoulder 267 of the disk 258 when the indicator 9 is lowered. See Fig. 7. The indicator 9 cannot be returned to its upper position unless the end 266 of said lever is disengaged from the shoulder 267. This is accomplished by rocking the lever 265 during the operation of the printing mechanism. Mounted on the lower end of said lever 265 is a spring-controlled pawl 268, adapted to be engaged by a pin 269 on the disk 263 when the shaft 198 is rotated. See Figs. 7 and 7ª. When the end 266 of the lever 265 is against the shoulder 267, the pawl 268 lies in the path of the pin 269, and upon the actuation of the printing mechanism, said pin will engage the pawl 268 with the lever 265, disengage the end 266 of the lever 265 from the shoulder 267, and permit the indicator 9 to be raised, thereby placing the machine in an inoperative condition.

Means are also provided to prevent the withdrawal of the key 252 before the indicator 9 is returned to its upper position. The said key is provided with a recess 270 in which the shoulder 271 of the housing 250 projects when the key is rotated. See Figs. 3 and 27. To allow the insertion of the key, this shoulder 271 is cut away as at 272. See Figs. 2 and 3. This construction of the housing compels the key to be in a horizontal position when it is inserted or withdrawn.

274 is a spring-controlled pawl pivoted at 275 to the housing 250 and said pawl has an extension 276 thereon which engages the end 277 of the lever 254. See Figs. 1, 26 and 26ª. When the key 252 is in a horizontal position, the end 277 lies in a recess 278 of said pawl and thereby prevents the lever 254 from being rocked, and consequently the machine is locked. The end 277 is released from the recess 278 by the key engaging a projection 279, which engagement rocks said pawl 274 to the position shown in Fig. 26ª. The pawl is held in this position by the end 277 engaging the extension 276, and when in said position, a projection 280 on said pawl 274 lies opposite the opening 272, and as a consequence, the key 252 cannot be rotated to its normal position to be withdrawn. (See Fig. 2.)

To allow the projection 280 to recede to its normal position and permit the removal of the key, it is necessary that the indicator 9 be raised to its full extent to allow the end of the arm 256 to drop into the recess 257, thereby allowing the lever 254 to be rocked by the spring 273, and to permit the end 277 of the lever 254 to drop in the recess 278 of the pawl 274. (See Fig. 26ª.)

To limit the unlocking movement of the key 252 and to keep it in a printing position, a pawl 281 is provided which is pivoted at 282 and is under the influence of a spring 283. This pawl engages the key at the end of the quarter turn of said key and thus acts as a stop for said key. See Figs. 25ª and 25ᵇ. The keys 252 are not interchangeable, that is—the key of one machine cannot unlock the machines of another company; this is due to a difference in the constructions of the keys, for example, the key 252 is provided with recesses or wards 284 which engage projections 285 on the housing 250. The positions of these projections and recesses may be changed in different machines to prevent the key of one machine unlocking another machine. See Figs. 23 and 27.

*Mode of operation.*

When the driver takes charge of the cab or vehicle, he places a key 252 bearing his identification in type in the machine and gives it a quarter turn. When the key is thus turned, it engages the end of the lever 254; this rocks the shaft 255 and disengages the lever 256 from the disk 258. See Figs. 2 and 7. This operation places the machine in an operative condition and the indicator 9 may then be lowered to indicate such condition. See Fig. 1ª. When the disengagement between the shaft 255 and the arm 256 takes place, the main setting shaft 3 is free to be rocked. When the driver so inserts his identification key, he rotates his printing wheels 147 and 148 by means of the knobs 153 to set the date. See Figs. 1 and 10. When a passenger wishes to hire the cab or vehicle, the driver sets the "engaging" time wheels 157, 158 and 159 by means of the knobs 153. It will be borne in mind that the wheels 157, 158 and 159 are printing wheels. The driver then rocks the main setting shaft 3 by lowering the indicator 9; this places the taximeter counters 23, 41, 50, 61 and 69 in an operative condition, the cams 11 and 12 on shaft 3 releasing the levers 13, 14 and 15 and the retaining pawls 19 and 20. See Figs. 15 and 16. At the same time, that is when the passenger engages the vehicle, the driver sets the supplement indicating wheels 61 and 69 by rocking the finger-piece 71. See Fig. 1ª. The setting of the wheels 61 and 69 also sets the supplement printing wheels 186 and 187 through the gears 189 and 190, telescopic shafts 188 and gears 87 and 88ª. See Figs. 1ª, 5 and 14. If the cab or vehicle stands or is not driven at a full speed, the taximeter counting wheels 23, 41 and 50 are driven by clock mechanism (not shown). If said vehicle is driven at a high speed, the said wheels are driven from one of the vehicle wheels as hereinbefore stated. The rotation of the wheels 23, 41 and 50 correspondingly rotates the printing wheels 179, 180 and 181 through the gears 183, 184 and 185, telescopic shafts 182 and gears 86. When the passenger leaves the cab or vehicle, the driver sets the "disengaging" time wheels 165, 166 and 167 by means of the finger knobs 172; see Figs. 1 and 10; he then rocks the crank arm 210, during the downward movement of which, the type on the printing wheels, the identification key, and the printing plate are inked, the carbon paper-feeding devices are actuated and an impression or print is taken, furnishing a ticket and a record thereof, the ticket to be given the passenger as a receipt for the fare paid. During the upward movement of said crank arm 210, the paper-feeding devices are actuated to issue said tickets through the opening in the front of the casing, where it is severed and is handed to the passenger. The driver then raises the indicator 9 and places the machine in an inoperative position, and permits the indicating and printing wheels to be returned to zero by the springs 57 and 76, the heart-shaped cams 88, 89 and 90, and the levers 91 and 94. The machine is then in a condition to be set for the next passenger.

Without limiting ourselves to the precise arrangement shown and described, which may be varied within the scope of the claims, we claim:

1. A fare-printing device, means for actuating the same, impression mechanism coöperating with said fare-printing device, separately operated means for actuating said impression mechanism, and setting mechanism controlling the operative relation between said fare-printing device and its actuating mechanism, and also controlling said impression mechanism actuating devices.

2. A fare-printing device, means for actuating the same, impression mechanism co-operating with said fare-printing device, separately operated means for actuating said impression mechanism, setting mechanism controlling the operative relation between said fare-printing device and its actuating mechanism actuating devices, and also controlling said impression mechanism, and means controlling said setting mechanism.

3. A fare-printing device, means for actuating the same, impression mechanism coöperating with said fare-printing device, separately operated means for actuating said impression mechanism, setting mechanism controlling the operative relation between said fare-printing device and its actuating mechanism and also controlling said impression mechanism actuating devices, and locking means controlling said setting mechanism.

4. A fare-printing device, means for actuating the same, impression mechanism coöperating with said fare-printing device, separately operated means for actuating said impression mechanism, setting mechanism controlling the operative relation between the fare-printing device and its actuating mechanism and also controlling said impression mechanism actuating devices, and a printing member controlling said setting mechanism and in operative relation with said impression mechanism.

5. A visible indicating and printing device, means for actuating the same, setting means controlling the operative relation between said visible indicating and printing device, and its actuating means, a printing member controlling said setting means, means for taking a print from said printing device and said printing member, said separately operated means being controlled by the setting means.

6. A visible indicating and printing device, means for actuating the same, setting means controlling the operative relation between said visible indicating and printing device, and its actuating means, a printing key controlling said setting means, separately operated means for taking a print from said printing device and said key, said separately operated means being controlled by the setting means.

7. A fare registering device, separately operated printing means for taking a print from said device, means for actuating said registering device, setting means controlling said separately operated printing means and the operative relation between the registering device and the actuating device, and means controlling said setting means.

8. A fare registering device, separately operated printing means for taking a print from said device, means for actuating said registering device, setting means controlling said printing means and the operative relation between the registering device and the actuating device, and a printing member controlling said setting means and in operative relation with said separately operated printing means.

9. Indicating wheels, and mechanically operated means for actuating said indicating wheels, in combination with mechanism adapted to establish an operative relation between the indicating wheels and said actuating means, and a key controlling said setting mechanism, said key having type thereon coöperating with printing devices by which the person operating the mechanism specified, is identified.

10. Indicating wheels, and mechanical means for actuating the same, in combination with setting mechanism for establishing an operative relation between said wheels and said actuating mechanism, said setting mechanism comprising a shaft and indicator, a dial on said shaft, an arm engaging said dial, a key controlling said arm, said key having an identification type thereon, and means coöperating with said identification type, whereby a print or impression is taken therefrom.

11. Indicating wheels, and levers adapted to actuate said wheels, in combination with setting mechanism for establishing operative relation between said indicating wheels and said levers, said setting mechanism comprising a shaft and an indicator, a dial mounted on said shaft, an arm engaging said dial, and a key controlling said arm and through which the movement of the setting mechanism is controlled.

12. Indicating wheels, corresponding printing wheels, and means for actuating said indicating and printing wheels, in combination with setting mechanism for establishing an operative relation between said wheels and said actuating means, independently actuated printing devices, and means whereby said setting mechanism and said printing devices are compelled to actuate consecutively.

13. Indicating wheels, corresponding printing wheels, and means for actuating said wheels, in combination with setting mechanism for establishing a coöperative relation between said wheels and said actuating mechanism, said setting mechanism consisting of a shaft and indicator, a dial on said shaft, printing mechanism comprising as an element a shaft, a dial mounted on said shaft, and levers engaging both of the aforesaid dials whereby said dials are compelled to rotate consecutively.

14. Indicating wheels, corresponding printing wheels, and means for actuating said indicating and printing wheels, in combination with setting mechanism for establishing an operative relation between said wheels and said actuating means, said setting mechanism consisting of a shaft and indicator, a dial on said shaft, printing mechanism consisting of a shaft and a platen, a dial mounted on said printing shaft, and levers engaging both of the aforesaid dials whereby the same are compelled to be actuated consecutively.

15. Indicating wheels, corresponding printing wheels, and means for actuating said wheels, in combination with setting mechanism for establishing an operative relation between the printing and indicating wheels and their actuating mechanism, said setting mechanism consisting of a shaft and indicator, a dial mounted on said shaft, a platen, devices for actuating said platen, a dial on said platen-actuating means, and levers between the dial on the shaft of the setting mechanism and the dial on the platen, and whereby one dial is locked by its own operation and is unlocked by the operation of the other dial.

16. Indicating wheels, corresponding printing wheels, and means for actuating said wheels, in combination with setting mechanism for establishing an operative relation between said wheels and their actuating means, said setting mechanism consisting of a shaft and indicator, a dial on said shaft, a platen, platen-actuating devices, a dial on said platen-actuating devices, and levers compelling the actuation of the dial on the shaft of the setting mechanism in advance of the actuation of the dial on the platen-actuating devices.

17. Indicating wheels, corresponding printing wheels, and means for actuating said wheels, in combination with mechanism for establishing an operative relation between said wheels and said actuating means, said means for establishing said operative relation consisting of a shaft and indicator, a key controlling said shaft and indicator, a dial on said shaft, a platen, platen-actuating devices, a dial on said platen-actuating devices, and means compelling the actuation of the dial on the shaft of the setting mechanism in advance of the dial on the platen-actuating devices.

18. Indicating wheels, corresponding printing wheels, and means for actuating said wheels, in combination with setting devices for establishing an operative relation between said wheels and their actuating means, said setting devices having among their members a shaft, a dial or disk mounted thereon, an arm engaging said dial, a key controlling said arm, printing mechanism having among its elements a shaft, a dial or disk on said shaft, and levers interposed between and engaging said dials or disks.

19. Indicating wheels, corresponding printing wheels, means for operating said wheels, in combination with setting devices for establishing a coöperative relation between said wheels and said actuating means, said setting devices having among its elements a shaft, a dial or disk on said shaft, an arm engaging said dial or disk, a key controlling said arm, printing devices having among their elements a shaft, a dial or disk on said shaft, and levers mounted between said dials or disks and adapted to compel the actuation of the dial on the shaft of the setting devices in advance of the dial on the shaft of the printing devices.

20. Indicating wheels, and printing wheels, in combination with means for actuating said wheels, printing mechanism, and means for compelling the consecutive operation of the printing wheels and the printing mechanism.

21. A series of printing wheels, a platen mounted adjacent to said wheels, and means for actuating said platen, in combination with a removable carbon paper holder supported on said platen, and means for advancing the carbon paper upon each actuation of the platen.

22. A series of printing wheels, a platen coöperating with said wheels to obtain prints or impressions therefrom, and means for actuating said platen, in combination with a removable carbon sheet box carried by said platen, a spool in said box upon which the carbon paper is wound, and means for rotating said spool upon each actuation of the platen.

23. A series of indicating wheels, a corresponding series of printing wheels, means for actuating said wheels concurrently, a platen below the printing wheels, and means for actuating said platen, a removable carbon paper box normally carried by said platen, a spool mounted in said box upon which the carbon paper is carried, and means for rotating said spool upon each operation of the platen.

24. A series of indicating wheels, a corresponding series of printing wheels, actuating means for said wheels, setting devices for establishing an operative relation between said wheels and said actuating means, a platen adjacent to the printing wheels, means for actuating said platen, a removable carbon paper holder carried upon the platen, and means for actuating the carbon paper upon each operation of the platen.

25. A series of printing wheels, a platen coöperating with said printing wheels, and means for actuating said platen, to print from said wheels, in combination with a carbon holder normally carried by said platen and comprising a box, a spool mounted in said box, feed rollers mounted in said box, and means for rotating the feed rollers to advance the carbon paper upon each actuation of the platen.

26. A series of printing wheels, a platen mounted below said printing wheels, and means for actuating said platen, in combination with a removable carbon paper box normally carried by said platen, a spool mounted in said box, feed rollers mounted in said box, guard plates mounted in said box above the platen and between which the carbon paper passes, and means for rotating the feed rollers to feed the carbon paper simultaneously with the actuation of the platen.

27. In a taximeter, fare indicating wheels, corresponding fare printing wheels, printing mechanism and paper-feeding mechanism, means for actuating said fare indicating and fare printing wheels, means for establishing an operative relation between said wheels and their operating devices, and an identification-printing key controlling the means for establishing such operative relation.

28. In a taximeter, two series of counters, one to indicate and the other to print upon tickets and to record the fare charges, and two series of counters one to indicate and the other to print upon said tickets extra charges, date and time printing wheels to print upon said tickets and records the dates and the time the cab or vehicle was engaged or hired and the termination of said engagement or hire, printing mechanism comprising inking devices and platen devices, and paper-feeding mechanism, and means for operating the printing mechanism in one movement, and the paper-feeding devices in the return movement, a carbon box carried by the platen, means for feeding a carbon sheet from said box.

29. In a taximeter, two series of wheels, one for indicating and the other for printing fare charges, and two series of wheels, one for printing and one for indicating extra charges, in combination with printing mechanism comprising inking devices, a platen, and means for operating the same, paper-feeding mechanism actuated by the means for operating the printing mechanism, a carbon box carried upon the platen and supporting carbon paper, and means for permitting independent movement between the platen and the carbon box for a certain period.

30. A fare-printing member, actuating mechanism for said member, setting mechanism controlling the operative relation between said fare-printing member and its actuating mechanism, and printing mechanism in operative relation with the printing member, of levers arranged to unlock the setting mechanism upon the operation of the printing mechanism, and to lock the printing mechanism upon the operation of the setting mechanism.

31. In a taximeter, the combination with printing mechanism, and a setting member, of levers one of which is capable of being actuated by said setting member to lock the printing mechanism after each operation of said printing mechanism, and the other of which is actuated by said operation of said printing mechanism to unlock said setting mechanism.

32. A fare-printing member, actuating mechanism for said member, setting mechanism controlling the operative relation between said fare-printing member and its actuating mechanism, and printing mechanism, of levers arranged to lock the setting mechanism upon the operation of the printing mechanism and said setting mechanism.

33. In a taximeter, setting mechanism comprising among its members, a rotating body with a lug therein, levers adapted to engage said lug to lock said mechanism at the termination of each setting operation, and means controlling said levers to effect a locking connection between said levers and lug at such time.

34. In a taximeter, a lever, printing mechanism comprising among its members a dial adapted to be engaged by said lever and to be locked thereby; and a setting member coöperating with said lever to lock the dial of the printing mechanism at the end of each operation in one direction of the setting mechanism.

35. In a taximeter, printing counters, means for actuating said counters, setting mechanism controlling the operative relation between said counters and said actuating mechanism, a platen, and actuating mechanism for said platen, of a lever interposed between said setting mechanism and said platen-actuating mechanism, whereby said last-named mechanism cannot be operated until said setting mechanism is operated.

36. In a taximeter, printing counters, means for actuating said counters, setting mechanism controlling the relation between said printing counters and said actuating mechanism, a platen, actuating mechanism for said platen, and levers interposed between said setting mechanism and said platen-actuating mechanism, whereby said setting mechanism is compelled to be actuated before and after the operation of said platen-actuating mechanism.

37. In a taximeter, printing devices, a platen coöperating therewith, means for actuating said platen, of a carbon-paper box carried by said platen, carbon-paper-feeding devices mounted in said box, and means whereby said carbon-paper-feeding devices are actuated from said platen devices.

38. In a taximeter, the combination with setting mechanism controlling the operative relation between counters and their actuating mechanism, of printing mechanism, levers arranged to lock the setting mechanism and unlock the printing mechanism, a key, and means acted upon by said key and also adapted to control the setting mechanism.

39. In a taximeter, the combination with setting mechanism controlling the operative relation between counters and their actuating mechanism, and printing mechanism, of levers arranged to unlock the setting mechanism and lock the printing mechanism, said levers being actuated by said mechanism and a key for identifying the person so operating the machine.

40. In a taximeter, the combination with counters, printing counters operatively connected therewith, actuating mechanism for said counters, setting mechanism controlling the operative relation between said counters and their operative mechanism, of levers arranged to unlock the setting mechanism at the conclusion of the operation of the printing mechanism and to lock the printing mechanism after each operation thereof and at the conclusion of the operation of the setting mechanism, said levers being actuated by said mechanisms, and a key initially controlling said setting and printing mechanisms.

41. Indicating wheels, corresponding printing wheels, and means for actuating said wheels, in combination with setting mechanism for establishing a coöperative relation between said wheels and said actuating mechanism, said setting mechanism consisting of a shaft and indicator, a dial on said shaft, printing mechanism comprising as an element, a shaft, a dial mounted on said shaft, and levers engaging both of the aforesaid dials, one of said levers being adapted to lock said setting mechanism at the completion of the movement of said setting mechanism in one direction and the other of said levers being adapted to unlock the printing mechanism in the same operation of said setting mechanism.

42. In a taximeter, the combination with counters, actuating mechanism for said counters, setting mechanism movable independently of said actuating mechanism and controlling the relation between said counters and said actuating mechanism, and a lever adapted to lock said setting mechanism at the completion of each setting movement of said mechanism.

43. In a taximeter, setting mechanism and printing mechanism, in combination with a lever adapted to lock said printing mechanism upon each complete operation of the setting mechanism in one direction.

44. In a taximeter, printing mechanism and setting mechanism in combination with a lever adapted to unlock said setting mechanism, said lever being engaged by the printing mechanism to move said lever from a locking engagement with said setting mechanism.

45. In a taximeter, the combination with setting mechanism, and platen-actuating mechanism, of means capable of being actuated by said platen-actuating mechanism to unlock said setting mechanism after each operation of said platen-actuating mechanism.

46. In a taximeter, printing mechanism, means adapted to lock said printing mechanism, and a setting member coöperating with said locking means to lock the printing mechanism at the conclusion of each complete operation of the setting mechanism in one direction.

47. In a taximeter, the combination with setting mechanism and printing mechanism, of levers actuated by said mechanisms to unlock the setting mechanism and to lock the printing mechanism.

48. In a taximeter, the combination with setting mechanism and printing mechanism, of levers actuated by said mechanisms to lock the setting mechanism and to unlock the printing mechanism.

49. In a taximeter, setting mechanism, a lever tending to lock said setting mechanism, and printing mechanism controlling said lever to release the setting mechanism.

50. In a taximeter, printing mechanism, a lever adapted to lock said printing mechanism, setting mechanism controlling and enabling said lever to be thrown into locking engagement with the printing mechanism, and means controlling said setting mechanism and controlled by the printing mechanism.

51. In a taximeter, a setting member having locking means thereon, a lever coöperating with said locking means to lock said setting member, printing mechanism including a dial, and means coöperating with said lever and arranged to be engaged by said dial and to actuate said lever to unlock the setting mechanism.

52. In a taximeter, a setting member and printing mechanism, in combination with a system of levers mounted on a common pivot and adapted to be actuated by the setting member when moved in one direction to lock the printing mechanism after each operation of the latter, and to be actuated by the printing mechanism to unlock the setting mechanism after each operation of the printing mechanism.

53. In a taximeter, a setting member, printing mechanism including a dial, levers mounted on a common pivot and in operative relation with the setting member and dial, one of said levers being adapted to lock the printing mechanism upon a movement in one direction of the setting member, and the other adapted to unlock the setting mechanism after each operation of the printing mechanism.

54. Indicating wheels, corresponding printing wheels connected thereto, printing devices coöperating with said printing wheels, means for operating said wheels at a predetermined rate, and means comprising a shaft, an indicator carried thereby, said means serving to lock said printing mechanism and to control the operative relation between said wheels and their operating means.

55. A printing wheel, printing mechanism coöperating therewith, means for actuating said wheel at a predetermined rate, setting means controlling the operative relation between said wheel and its actuating mechanism, said setting means also controlling said printing means, and a lock for controlling said setting means.

56. A printing wheel, printing mechanism coöperating therewith, means for actuating said wheel at a predetermined rate, setting means controlling the operative relation between said wheel and its actuating mechanism, and means coöperating with said printing means and controlling said setting means.

57. A printing wheel, printing mechanism coöperating therewith, means for actuating said wheel at a predetermined rate, setting means controlling the operative relation between said wheel and its actuating mechanism and also controlling said printing mechanism, and a printing key coöperating with said printing mechanism and controlling said setting mechanism.

58. Indicating wheels, and means for actuating the same at a predetermined rate, in combination with setting means for establishing an operative relation between the indicating wheels and the actuating means therefor, said setting means comprising a shaft and an indicator, a dial on said shaft, an arm engaging said dial, and a key controlling said arm.

59. Indicating wheels, and levers adapted to actuate said indicating wheels at a predetermined rate, in combination with setting mechanism for establishing an operative relation between said wheels and levers, and means comprising a key and levers for controlling the movement of said setting mechanism.

60. Indicating wheels, and levers adapted to operate the same at a predetermined rate, in combination with setting means or mechanism comprising a shaft and indicator adapted to control the operative relation between said indicator wheels and said levers, and mechanism comprising a key and levers adapted to control the movement of the setting mechanism.

61. Indicating wheels, corresponding printing wheels, and means for actuating said indicating and printing wheels at a predetermined rate, in combination with setting mechanism for establishing an operative relation between said wheels and said setting mechanism, a dial mounted upon the shaft of said setting means, printing mechanism, and suitable connection between said printing mechanism and said dial.

62. A printing wheel, means for actuating the same at a predetermined rate, printing means adapted to take ticket and record impressions from said wheel, and setting mechanism controlling the operative relation between said wheel and also controlling said actuating means and said ticket and record printing means.

63. Fare printing type and means for actuating the same in accordance with a predetermined rate, in combination with ticket feeding mechanism, impression mechanism coöperating with said fare printing type for printing tickets, and setting mechanism controlling the operative relation between the fare printing type and their actuating mechanism and also unlocking the impression mechanism to permit it to be operated.

64. Fare printing type and means for actuating the same, in combination with ticket feeding mechanism, impression mechanism coöperating with said fare printing type in printing tickets and including an operating lever, and setting mechanism including a lever separate from the impression lever controlling the operative relation between the fare printing type and its actuating mechanism, and also controlling the operative relation between said impression mechanism and its operating lever.

65. Fare printing type, and means for actuating the same according to a predetermined rate, in combination with ticket feeding mechanism, impression mechanism coöperating with said fare printing type in printing tickets, setting mechanism controlling the operative relation between said printing type and their actuating means, and means interposed between said setting mechanism and said impression mechanism whereby the setting mechanism is instrumental in locking and unlocking said impression mechanism.

66. Fare printing type, and means for actuating the same according to a predetermined rate, in combination with ticket feeding mechanism, impression mechanism coöperating with said fare printing type in printing tickets, means for actuating said impression mechanism including a lever, setting mechanism including a lever separate from the impression lever controlling the operative relation between said fare printing type and its actuating means, and also controlling the operative relation between said impression mechanism and its operating lever.

67. Fare printing type, and means for actuating the same according to a predetermined rate, in combination with ticket feeding mechanism, impression mechanism coöperating with said fare printing type in printing tickets, actuating mechanism for said impression mechanism, setting mechanism controlling the operative relation between said fare printing type and its actuating mechanism, and locking mechanism controlling the operations of the impression mechanism, the said setting mechanism being adapted to actuate said locking mechanism to establish a coöperative or non-coöperative relation between said impression mechanism and its actuating mechanism.

In testimony whereof we affix our signatures, in presence of two witnesses.

JOHN F. OHMER.
ELMER HENRY BRIDENBAUGH.

Witnesses:
C. M. THEOBALD,
R. J. McCARTY.

Copies of this patent may be obtained for five cents each, by addressing the "Commissioner of Patents, Washington, D. C."